US011097583B2

(12) United States Patent
Rohde

(10) Patent No.: US 11,097,583 B2
(45) Date of Patent: Aug. 24, 2021

(54) VEHICLE

(71) Applicant: Ruprecht Alfred Rohde, Wackersberg (DE)

(72) Inventor: Ruprecht Alfred Rohde, Wackersberg (DE)

(*) Notice: Subject to any disclaimer, the term of this patent is extended or adjusted under 35 U.S.C. 154(b) by 155 days.

(21) Appl. No.: 16/699,006

(22) Filed: Nov. 28, 2019

(65) Prior Publication Data

US 2020/0171903 A1 Jun. 4, 2020

Related U.S. Application Data

(60) Provisional application No. 62/773,280, filed on Nov. 30, 2018.

(51) Int. Cl.
*B60G 7/00* (2006.01)
*B60G 1/04* (2006.01)

(52) U.S. Cl.
CPC .............. *B60G 7/003* (2013.01); *B60G 1/04* (2013.01); *B60G 2300/24* (2013.01); *B60G 2300/40* (2013.01)

(58) Field of Classification Search
CPC ...... B60G 7/003; B60G 1/04; B60G 2300/24; B60G 2300/40
See application file for complete search history.

(56) References Cited

U.S. PATENT DOCUMENTS

| | | | |
|---|---|---|---|
| 3,222,078 A * | 12/1965 | Clarke | B62K 5/00 280/7.17 |
| 3,533,663 A * | 10/1970 | Pianalto | B62D 55/04 305/19 |
| 4,627,508 A | 12/1986 | Auer | |
| 4,786,070 A * | 11/1988 | Adee | B62K 15/006 280/288.1 |
| 2004/0216932 A1 | 11/2004 | Giovanetti et al. | |
| 2012/0018233 A1 | 1/2012 | Chang et al. | |
| 2015/0196439 A1 | 7/2015 | Osipov et al. | |
| 2019/0133869 A1 | 5/2019 | Aflatoon | |

FOREIGN PATENT DOCUMENTS

| | | | |
|---|---|---|---|
| DE | 2657605 A1 * | 7/1977 | ............. A61G 5/066 |
| DE | 10334956 A1 | 3/2005 | |
| DE | 102011079143 A1 | 3/2012 | |
| DE | 102017006071 A1 | 1/2019 | |

(Continued)

OTHER PUBLICATIONS

Action Manufacturing, Action Trackchair® Owner's Manual, Revision Nov. 3, 2016, retrieved from http://actiontrackchair.com/wp-content/uploads/2017/07/TrackChair_and_TrackStanders_Owner_Manual.pdf on Nov. 10, 2019.

(Continued)

*Primary Examiner* — Faye M Fleming
(74) *Attorney, Agent, or Firm* — Smartpat PLC

(57) ABSTRACT

A multi-functional off-road vehicle has a frame which includes a left lateral frame member and a right lateral frame member. The two frame members are connected by a crossbar. Four wheel assemblies are connected to the frame. At least two of the wheel assemblies are continuous tracks. The crossbar includes a track width adjustment actuator which extends and contracts a length of the crossbar and thereby changes a track width of the vehicle.

18 Claims, 13 Drawing Sheets

(56) References Cited

FOREIGN PATENT DOCUMENTS

| EP | 0146029 A3 | 6/1985 | |
|---|---|---|---|
| EP | 2216005 A1 | 8/2010 | |
| JP | 04328013 A | * 11/1992 | ......... B60G 2200/13 |
| WO | 2009069144 A3 | 9/2009 | |

OTHER PUBLICATIONS

Alan Baum, "Mantis Demonstration Video and The Adventures of Mantis Man", published video at https://www.youtube.com/watch?v=4mjye8WrFQk, Nov. 10, 2013, retrieved Nov. 10, 2019.

Alan Baum, "Magic Carpet Go Kart (a personal tracked vehicle)", Jul. 6, 2019, Video published at https://www.youtube.com/watch?v=C2eYD4CV0ql retrieved Nov. 17, 2019.

Barrierefrei1, "Extrem Gelande Rollstuhl HexHog Wildsau", Sep. 11, 2017, Video published at https://www.youtube.com/watch?v=J29TIdREZSg retrieved Nov. 17, 2019.

Barrierefrei1, "Leichtester elektro Rollstuhl E-Scooter der Welt", Oct. 11, 2017, Video published at https://www.youtube.com/watch?v=TAjVnti5piY, retrieved Nov. 17, 2019.

B-Free Tech Ltd, "B-Free Chair—All Terrain Multi Function Stair-Climbing Power Wheelchair", published video at https://www.youtube.com/watch?v=WzZwkE910f0, Aug. 6, 2014, retrieved Nov. 10, 2019.

Burkhard Zachewicz, "54_MPP45HU.mpg", May 14 2012, Video published at https://www.youtube.com/watch?v=mG_7ey78atU retrieved Nov. 17, 2019.

Caterwil, "Caterwil—sedia a rotelle per scalata per una reale mobilità", Nov. 8, 2018, Video published at https://www.youtube.com/watch?v=v8ytCSe2lfw retrieved Nov. 17, 2019.

Edgar Klitsch, reha triflex Produkte für die flexible Anpassung an die jeweiligen Bedürfnisse, unknown publication date, retrieved from http://reha-triflex.de/Reha%20Triflex%202019.pdf on Nov. 10, 2019.

Eng. Ary Prado, "Cadeira De Rodas Para Subir Escadas Crosschair", published video at https://www.youtube.com/watch?v=SGY7uITYRG0, Mar. 21, 2012, retrieved Nov. 10, 2019.

Erollator Von Emovements, "Der eRollator von eMovements—zweiter Prototyp", Feb. 3, 2016, Video published at https://www.youtube.com/watch?v=9QzC27Rk2Bw retrieved Nov. 18, 2019.

Howe and Howe Technologies, Inc; "Ripchair 3.0 the Ultimate Tracked Off Road Chair", publication date unknown, retrieved from http://www.trackchairextreme.com/specifications.html on Nov. 17, 2019.

HyundaiUSA, "Project Elevate | Hyundai", Jan. 7, 2019, Video published at https://www.youtube.com/watch?time_continue=3&v=A33Yu-9rgxo retrieved Nov. 17, 2019.

Iknowaguy, "Home Made Half Track Kit for Riding Lawn Mower", Dec. 27, 2018, Video published at https://www.youtube.com/watch?v=jOyn9XojepU retrieved Nov. 17, 2019.

Lehner Lifttechnik GMBH, Stairmax Autonomous stairclimber brochure, publication date unknown, retrieved from https://www.lehner-lifttechnik.at/en/Products/Stairclimbers/Stairmax on Nov. 17, 2019.

Livingston Innovations, Freedom Trax User's Manual, dated May 2018, retrieved from https://freedomtrax-europe.com/wp-content/uploads/2018/09/Users-manual-Freedom-Trax-V3-GB-0918.pdf on Nov. 10, 2019.

Marc Palud, "DTV Shredder Western Canada Launch Video", Feb. 14, 2015, Video published at https://www.youtube.com/watch?v=aEQM9SvgNQ retrieved Nov. 17, 2019.

Rajmudra Group, "Stair Climbing Vehicle", May 9, 2014, Video published at https://www.youtube.com/watch?v=6eb-87z84vE retrieved Nov. 17, 2019.

Schweizer Bauer, "Aebi EC130", Sep. 18, 2016, Video published at https://www.youtube.com/watch?v=gq_-xDvnDsl retrieved Nov. 16, 2019.

SHOO4639, "Galileo Stair Climbing Wheelchair", Mar. 25, 2009, Video published at https://www.youtube.com/watch?v=ik286spRM1w retrieved Nov. 17, 2019.

Spiegel TV, Roboter-Krieg: Der Soldat der Zukunft und Militar—High-Tech—Spiegel TV Magazin, Sep. 14, 2011, Video published at https://www.youtube.com/watch?v=Wp6mNcBwSc4 retrieved Nov. 18, 2019.

Sven Schmutzler, "Testfahrt im Otto Bock ScoutCrawler", published video at https://www.youtube.com/watch?v=akgBZoNeeg4, Sep. 16, 2016, retrieved Nov. 10, 2019.

Tanja Konrad, "Outdoor-Elektrorollstühle für den Trip ins Abenteuer", Apr. 20, 2005, retrieved from https://www.der-querschnitt.de/archive/18780 on Nov. 17, 2019.

The Japan Times, "Introducing CanguRo, three-wheeled robot", Jul. 5, 2018, Video published at https://www.youtube.com/watch?v=yWyjir_cDuM retrieved Nov. 17, 2019.

Therapyworld1, "Rollator met rupsbanden voorkomt vallen!", Mar. 30, 2010, Video published at https://www.youtube.com/watch?v=QUG1HBIu1iA retrieved Nov. 19, 2019.

VDKTV, VdK-TV: Der E-Rollator—ein Rollator mit Motor, Dec. 7, 2015, Video published at https://www.youtube.com/watch?v=IsGQkPKk4g0 retrieved Nov. 18, 2019.

Zonzini SRL, "Domino Automatic", publication date unknown, retrieved from https://www.zonzini.us/wp-content/uploads/sites/5/2015/07/Catalogue-Domino.pdf on Nov. 17, 2019.

* cited by examiner

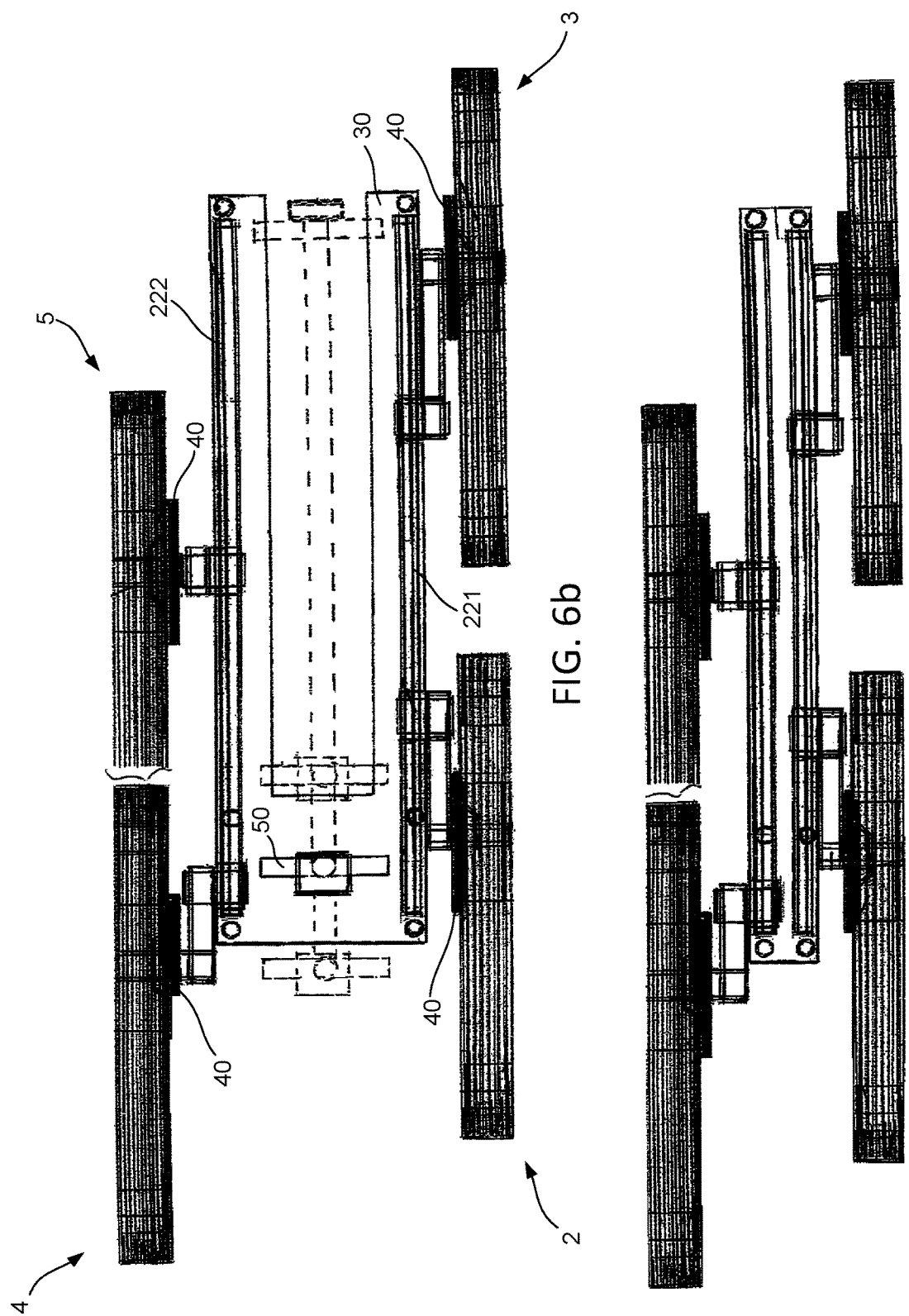

VEHICLE

TECHNICAL FIELD

The present application relates to a multi-functional vehicle which can be configured as a walking aid or a platform to carry persons and cargo off-road.

BACKGROUND

Vehicles which can be used as walking aids, or short walkers, are generally known. However, known walkers are typically suitable only for use on flat surfaces and are unable to support a person or carry cargo off road, in particular on rough and stepped terrain.

SUMMARY

The is a need for a vehicle to aid persons desiring to move about off-road in challenging terrain who are unable to do so without support. An object of the present disclosure is to provide a simple yet multi-functional device that can be used as a crutch similar to a walker and/or as driving, transport, training, and rehab aid for such users and terrain, which is versatile to be equipped and used, easy manageable and space saving.

The disclosed vehicle is compact enough such that it can be transported in a car. Larger versions of the vehicle can be transported in a van.

The disclosed vehicle can be used in different configurations in challenging off-road terrain, either self- or externally controlled. The vehicle may be used as a walking and driving aid in leisure, work, training and medical rehab. It may also be used as a transport vehicle for persons who may be standing, sitting (also in a wheelchair) or lying on the vehicle (e.g. in a stroller or during rescue operations on a stretcher). The vehicle can be used to transport objects such as parcels, merchandise, luggage, tools and the like. The vehicle may also be used as a platform to connect exercise and/or rehabilitation equipment, mowers, cutter, lifting tools, cable, boom, robot and the like. The vehicle may further be used for towing trailers, skijoring etc.

The vehicle is assembled according to the modular principle of sub-assemblies or modules. The sub-assemblies/modules include wheel assemblies, a frame, and a platform. The modules or their components can be exchanged to customize the individual vehicle to serve various functions. The vehicle can e.g. be configured as a walker or a transport vehicle. Reconfiguration of the vehicle may be used to adapt to changing user needs and abilities and different conditions of use such as driving surface in summer or winter or in varying terrain.

The vehicle can be three-point or four-point suspended (three-wheeled or four-wheeled), depending on requirements. A three-wheeled vehicle has a more elaborate chassis, but the advantage of easier hand control, and it can negotiate tighter turns on a difficult, multi-level surface than a four-point suspended vehicle. A vehicle whose body is four-point-suspended on four wheels similar to a car usually has less elaborate running gear carrier in the vehicle and can better withstand lateral centrifugal forces.

In both types of suspension by extending the wheelbase or the track width the center of gravity of the load can be moved to a position favorable for the overall center of gravity of the vehicle to avoid tilting of the vehicle on strongly inclined ground.

The vehicle moves on wheel assemblies. A wheel assembly here refers to one or more wheels, rollers and chain, belt or belt-like drives. When using chain, belt or belt-like continuous tracks, the number of track rollers between the idler roller and the drive roller and their distance from one another depends on the total weight of the vehicle with load, the type of steering (differential steering or steerable wheel assembly), the nature of the surface to be traveled, the driving speed and the desired curve radii.

For use in any type of terrain, the vehicle can be controlled to adjust in a horizontal plane to the steering of the vehicle, a change of the track width and the wheelbase and in a vertical plane, to increase the ground clearance, to reduce the inclinations of the frame at larger inclinations of the ground and to overcome even high steps.

The vehicles includes a U-shaped frame which is open towards the rear in most applications when viewed from above. The frame is composed of several elements and structurally the main supporting element of the vehicle. The vehicle's wheel assemblies are connected to the frame.

A platform is mounted on the frame. It can be shaped differently according to different requirements and also designed to be overlapping, to allow a telescoping of the vehicle. For the use of the vehicle as a walker or a crutch the platform can be shaped like a U with a sufficiently large cutout to easily walk therein. It offers lateral and front space for storing shopping bags and the like. It offers mounting options for various attachments.

The vehicle may be propelled by hand in a lightweight design similar to a walker or driven by motors. The non-motorized vehicles are accelerated by hand by thrust, braked by hand on brake lever, linkage and brakes. The motorized vehicles are controlled by signals triggered by hand or external devices which are activated via brake levers and/or other control. Such controls may include linkages, cables and/or electrical signals conducted/sent to electrical and/or hydraulic components.

The vehicle may be steered according to usage and conditions of use by hand by pulling/pushing directly on the whole vehicle or via ropes/linkage on running gear parts or by different acceleration of the drives of the lateral drive motors (differential steering) or by steering certain wheel assemblies by electrical and/or hydraulic components.

Controls can include the triggering of certain activities of certain parts of the vehicle by manual pressure/tension, electrical signals to motors or electrical and/or hydraulic components that can be triggered by buttons, sensors or computers.

The vehicle motors may be powered from an energy sources which are batteries and/or fuel.

In one configuration, the vehicle has a frame which includes a left lateral frame member and a right lateral frame member. The left lateral frame member and the right lateral frame member are connected by a crossbar. A left front wheel assembly is attached to the left lateral frame member. A left rear wheel assembly is attached to the left lateral frame member. A right front wheel assembly is attached to the right lateral frame member, and a right rear wheel assembly is attached to the right lateral frame member. At least two of the wheel assemblies are continuous track assemblies. Each continuous track assembly includes a drive wheel operatively connected to a motor, an idler wheel, and an axle beam rotatably supporting the drive wheel and the idler wheel at a distance from one another. A continuous belt loops around the drive wheel and the idler wheel. The crossbar includes a track width adjustment actuator to extend and contract a length of the crossbar and thereby change a track width of the vehicle.

The front wheel assemblies may be continuous track assemblies. In that case, the vehicle may have on each side a front strut having a lower end firmly connected to the axle beam of the front wheel assembly and an upper end rotatably connected to the lateral frame member so as to be able to rotate about a generally vertical steering axis.

The vehicle may further include, on each side of the vehicle, a front strut bracket pivotally connecting the upper end of the front strut to the lateral frame member with a front strut pivot pin and a height adjustment actuator to pivot the front strut about the front strut pivot pin. The front strut bracket may be slidably arranged within a rail respectively formed in each lateral frame member.

A steering actuator may be arranged between the front strut bracket and the front strut, the steering actuator configured to rotate the front strut about its steering axis.

The height adjustment actuator may have a first end pivotally connected to the front strut bracket and a second end pivotally connected to the lateral frame member. The height adjustment actuator may extend and contract its length and thereby pivot the front strut and the wheel assembly connected thereto about the front strut pivot pin.

The front strut may be arranged outwardly of the lateral frame member.

The track width of the vehicle may be adjusted while driving. A front track width between the front wheel assemblies and a rear track width between the rear wheel assemblies may not be the same.

In another configuration the vehicle has a frame with a left lateral frame member and a right lateral frame member. The left lateral frame member and the right lateral frame member are connected by a variable-length crossbar. A length of the crossbar is adjustable by a track width adjustment actuator configured to extend and contract the crossbar and thereby change a track width of the vehicle. A continuous track left front wheel assembly is attached to the left lateral frame member. A continuous track left rear wheel assembly is attached to the left lateral frame member. A continuous track right front wheel assembly is attached to the right lateral frame member, and a continuous track right rear wheel assembly is attached to the right lateral frame member. Each continuous track wheel assembly includes a front wheel, a rear wheel, and a continuous belt looping around the front wheel and the rear wheel. An axle beam rotatably supports the front wheel and the rear wheel at a distance from one another. A strut connects the axle beam to the lateral frame member.

An actuator may be arranged in a pivot joint which connects the strut and the axle beam. The actuator may be configured to adjust an angle between the strut and the axle beam.

An actuator may be arranged in a pivot joint which connects the strut and lateral frame member. That actuator may be configured to adjust an orientation of the strut.

The strut may be telescoping and include a height adjustment actuator configured to control a length of the telescoping strut.

The strut may be connected to a sliding strut bracket. The sliding strut bracket may be slidingly arranged in a rail extending along the lateral frame member. An axle distance adjustment actuator may arranged at the rail to slide the sliding strut bracket forward and backward within the rail.

The vehicle may be configured as a walker and include a height-adjustable railing.

The vehicle may include a seat or a stand which is slidingly arranged within the frame. A position of the seat or the stand relative to the frame may be actively controlled to maintain a beneficial position of the vehicle's center of gravity.

The vehicle may include a platform which is connected to the frame by four separately controllable height adjustment actuators. A gyroscopic sensor may be mounted on the platform. An electronic control module may be operatively connected to the gyroscopic sensor and to the separately controllable height adjustment actuators. The electronic control module may be configured to control the height adjustment actuators in response to data received from the gyroscopic sensor to maintain an approximately level orientation of the platform.

The following detailed description is merely exemplary in nature and is not intended to limit the invention or the application and uses of the invention. Furthermore, there is no intention to be bound by any theory presented in the preceding background or the following detailed description.

BRIEF DESCRIPTION OF THE DRAWINGS

FIG. 1b is a top view of the vehicle as in FIG. 1a.

FIG. 3b is a front view of the vehicle as in FIG. 3a.

FIG. 4b is a top view of the vehicle as in FIG. 4a.

FIG. 5b is a front view of the vehicle as in FIG. 5a.

FIG. 6b is a top of a vehicle as in FIG. 6a in a wide configuration.

FIG. 6c is a top of a vehicle as in FIG. 6a in a narrow configuration.

FIG. 7b is a front view of the vehicle as in FIG. 7a.

DETAILED DESCRIPTION

Figure 1A:
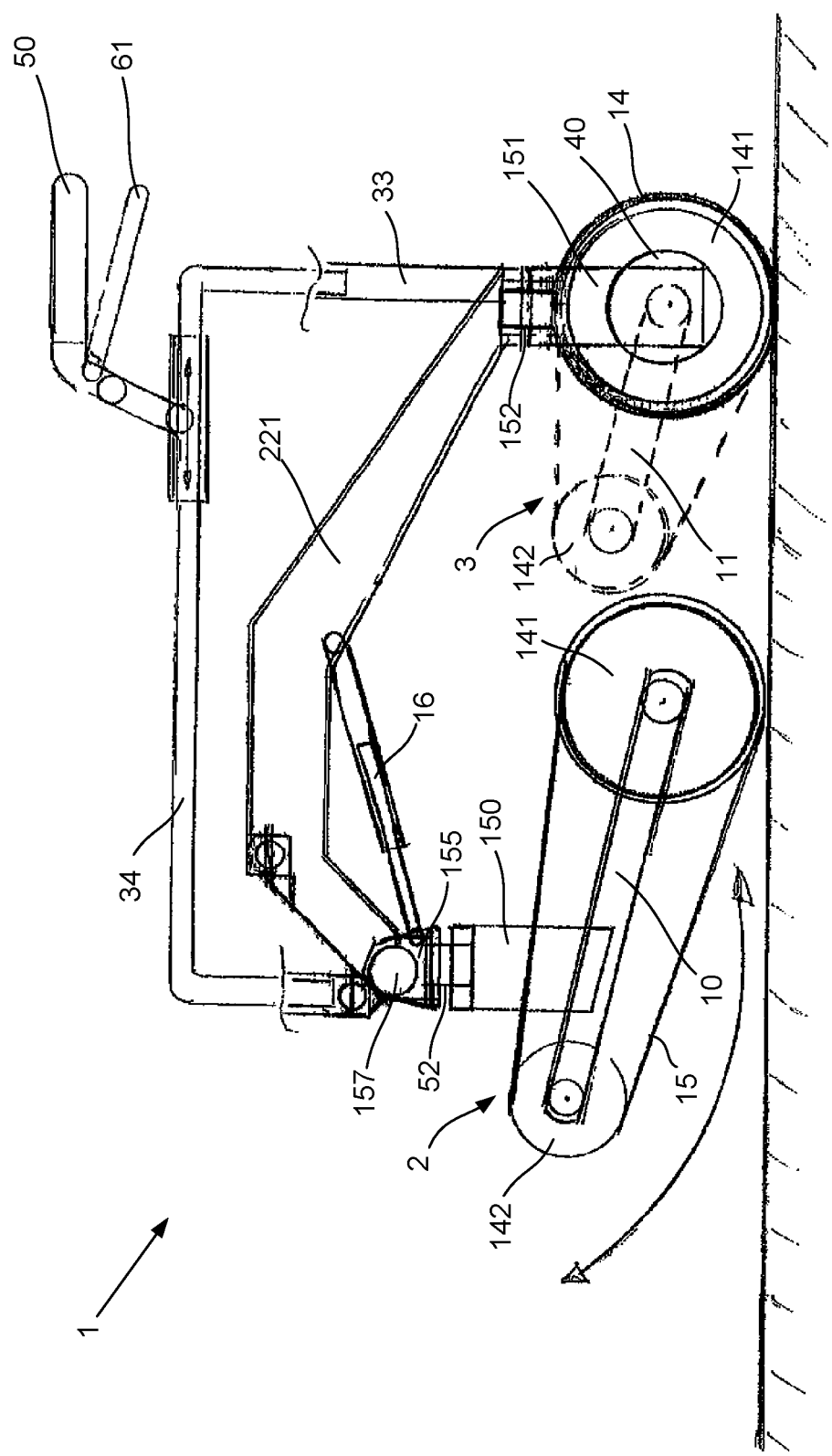
FIG. 1a is a side showing an example of a multi-functional vehicle.

Throughout this detailed description the same reference numeral will be used to indicate like or functionally related parts in different exemplary embodiments of multi-functional vehicles. Use of the same reference numeral is not meant to indicate that parts are identical or serve identical functions throughout the various examples.

Figure 1B:
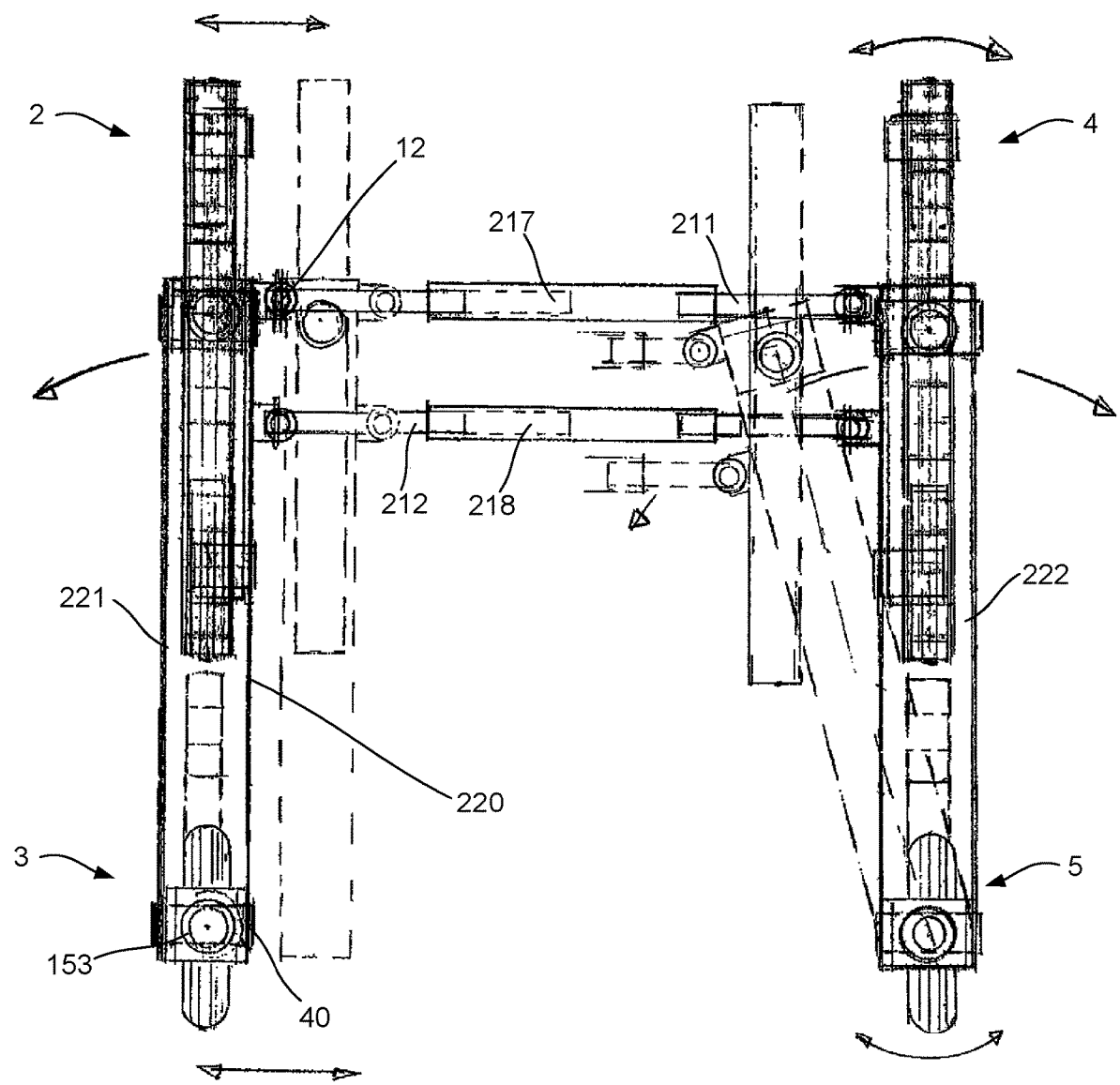

Referring to FIG. 1a and FIG. 1b, an example of a vehicle 1 suitable for use as a walker (walking aid) is shown. The vehicle has a generally U-shaped frame 220. The frame 220 includes a left lateral frame member 221 and a right lateral frame member 222. The left lateral frame member 221 and the right lateral frame member 222 are connected to one another by crossbars. The crossbars include a first crossbar 211 which is arranged in front of and below a second crossbar 212.

Arranged centrally within the first crossbar 211 is a first track width adjustment actuator 217. The first track width adjustment actuator 217 is configured to adjust a distance between opposite ends of the first crossbar 211 and consequently a distance between the left lateral frame member 221 and the right lateral frame member 222 at the first crossbar 211. Similarly, a second track width adjustment actuator 218 is provided. The second track width adjustment actuator 218 is arranged centrally within the second crossbar 212 and configured to adjust a length of the second crossbar 212. The first crossbar 211 and the second crossbar 212 are pivotally connected to the left and right lateral frame member 221, 222 by joints having crossbar pivot pins 12. The crossbar pivot pins 12 are oriented vertically to allow the lateral frame members 221,222 to pivot horizontally.

The vehicle 1 includes four wheel assemblies 2, 3, 4, 5. A left front wheel assembly 2 is connected to a front portion of the left lateral frame member 221. A right front wheel assembly 4 is connected to a front portion of the right lateral frame member 222. A left rear wheel assembly 3 is connected to a rear portion of the left lateral frame member 221. A right rear wheel assembly 5 is connected to a rear portion of the right lateral frame member 222.

Preferably, each of the four wheel assemblies 2, 3, 4, 5 is a continuous track assembly. Each continuous track assembly includes a road wheel 141, an idler wheel 142, and an axle beam 10 rotatably supporting the road wheel 141 and the idler wheel 142 at a distance from one another. A continuous belt 15 loops around the road wheel 141 and the idler wheel 142. The road wheel 141 may be operatively connected to a motor 40 and referred to as a drive wheel. In other configurations an idler wheel, which is not permanently in contact with the ground, may be connected to a motor and thus be the drive wheel.

As shown, the road wheel 141 is arranged behind the idler wheel 142. During normal operation, the road wheel 141 is in constant contact with the ground and bears weight. A default tilt of the axle beam 10 and the size of the idler wheel 142 are selected such, that on a flat surface the idler wheel 142 is elevated above the ground. Normally, the idler wheel 142 will only have ground contact when the vehicle 1 is traversing bumps or steps in rough terrain. As shown, the diameter of the idler wheel 142 can be smaller than the diameter of the road wheel 141. The front and rear continuous track assemblies may be arranged such that the axle beams 10 of both assemblies are upwardly angled in driving direction. On a hard surface, the leading idler wheel 142 is not contacting the ground.

Each front wheel assembly 2, 4 is connected to a front portion of the frame 220 by a front strut 150. An upper end of the front strut 150 is rotatably connected to a strut bracket 155 by a steering actuator 52. The steering actuator 52 controls rotation of the front strut 150 around its longitudinal axis. The longitudinal axis of the front strut 150 here coincides with a steering axis. Rotation around the steering axis allows the front wheel assemblies 2, 4 to turn left and right relative to the strut bracket 155.

The strut bracket 155 is pivotally connected to a front portion of the frame 220 by a strut joint 157. The strut joint 157 allows the strut bracket 155 to pivot forward and backward within the same plane in which the respective lateral frame member 221, 222 is arranged. The strut joint 157 includes a pivot pin which is arranged perpendicular to that plane. Pivot motion of the strut bracket 155 controls a pitch angle of the front wheel assembly 2, 4.

A lower end of the front strut 150 is fixedly connected to a center portion the axle beam 10. Consequently, the pitch of the front wheel assemblies 2, 4 controls a height of the front portion of the frame 220 over the ground. This height is actively controlled by a height adjustment actuator 16. One end of the height adjustment actuator 16 is pivotally connected to the lateral frame member 221. An opposite end of the height adjustment actuator 16 is pivotally connected to the strut bracket 155. Contraction and extension of the height adjustment actuator 16 causes the strut bracket 155 to pivot about its pivot pin. The pivot motion of the bracket 155 extends to the strut 150 and the entire wheel assembly 2 mounted to the strut 150.

In some variants, the wheel assemblies may use a single wheel 14 instead of a continuous track assembly. For example, the idler wheel 142 and the belt 15 (shown in FIG. 1a in dotted line) may be omitted from the rear wheel assemblies 3, 5. A single rear wheel 14 may then be used. The single rear wheel 14 may be rotatably connected to a lower end of a rear strut 151. An upper end of the rear strut 151 is connected to a rear portion of the lateral frame member 221 so as to be axially rotatable by a rear steering joint 152. The axial rotation of the rear wheel may be actively controlled by a rear steering actuator 153. The rear wheel 14 may be propelled by a motor 40.

The vehicle 1 may be manually steered by an operator pushing the steering handle 50. During such manual steering the front steering actuator 52 may be in a trailing mode without any torque being applied between the front strut 150 and the strut bracket 155. Alternatively, when the front steering actuator 52 is activated, the trailing mode is locked. The locking is omitted when the track width adjustment 217, 218 is activated and thereby the length of the crossbars 211, 212 and thus a track width of the vehicle 1 is changed. This is, because the rear wheel assemblies 3, 5 are connected via the rear steering joint 152 with the lateral frame members 221, 222 and indirectly with the crossbars 211, 212 and thus with the track width adjustment actuators 217, 218.

Attachments can be mounted to the lateral frame members 221, 222. The attachments may include steering and support rods 33. The attachments may include a height-adjustable railing 34, which may e.g. be held onto by a human used while walking between the lateral side panels in rough terrain and using the vehicle as a walking aid. A mechanical steering handle 50 and a brake handle 61 may be slidably attached to the height-adjustable railing 34. The steering handle 50 and the brake handle 61 may slide forward and backward along a generally straight upper portion of the railing 34. Additional controls, e.g. a control keyboard, may be arranged alongside the steering and brake handles.

The control of the track width adjustments 217, 218 advantageously allows to change the track width of the vehicle while driving. In this case, a four-point suspension is maintained when the two track width adjustments 217, 218 are changed by the same length. Simultaneous adjustment of both track width adjustments 217, 218 causes the lateral frame members 221, 222 and the wheel assemblies 2, 3, 4, 5 to stay parallel.

An approximately three-point suspension is achieved when the front track width adjustment mechanism 217 is controlled to be shorter than the rear track width adjustment mechanism 218. In that configuration, the frame 200 is converted from a generally U-shaped arrangement to an approximately V-shaped arrangement. The front wheel assemblies 2, 4 are closer together than the rear wheel assemblies 3, 5. The front wheel assemblies 2, 4 may move so close together that they essentially form a single suspension point, thus converting the previously four-wheeled vehicle to a three-wheeled vehicle.

The lateral frame members 221, 222 preferably have a generally arched shape. As shown, the lateral frame members may be arranged in a common vertical plane with the wheel assemblies. The lateral frame members 221, 222 may have an elevated center portion which is arranged between a front portion and a rear portion. The front portion extends from a front end to the center portion. The rear portion extends from a rear end to the center portion. The front end and the rear end are closer to the ground than the center portion. The vertically curved lateral frame members 221, 222 provide exceptional ground clearance for the vehicle and allow the vehicle 1 to drive over relatively high obstacles. For example, the vehicle 1 may be able to clear obstacles as high as 25 cm, or even obstacles as high as 50 cm.

Figure 2:
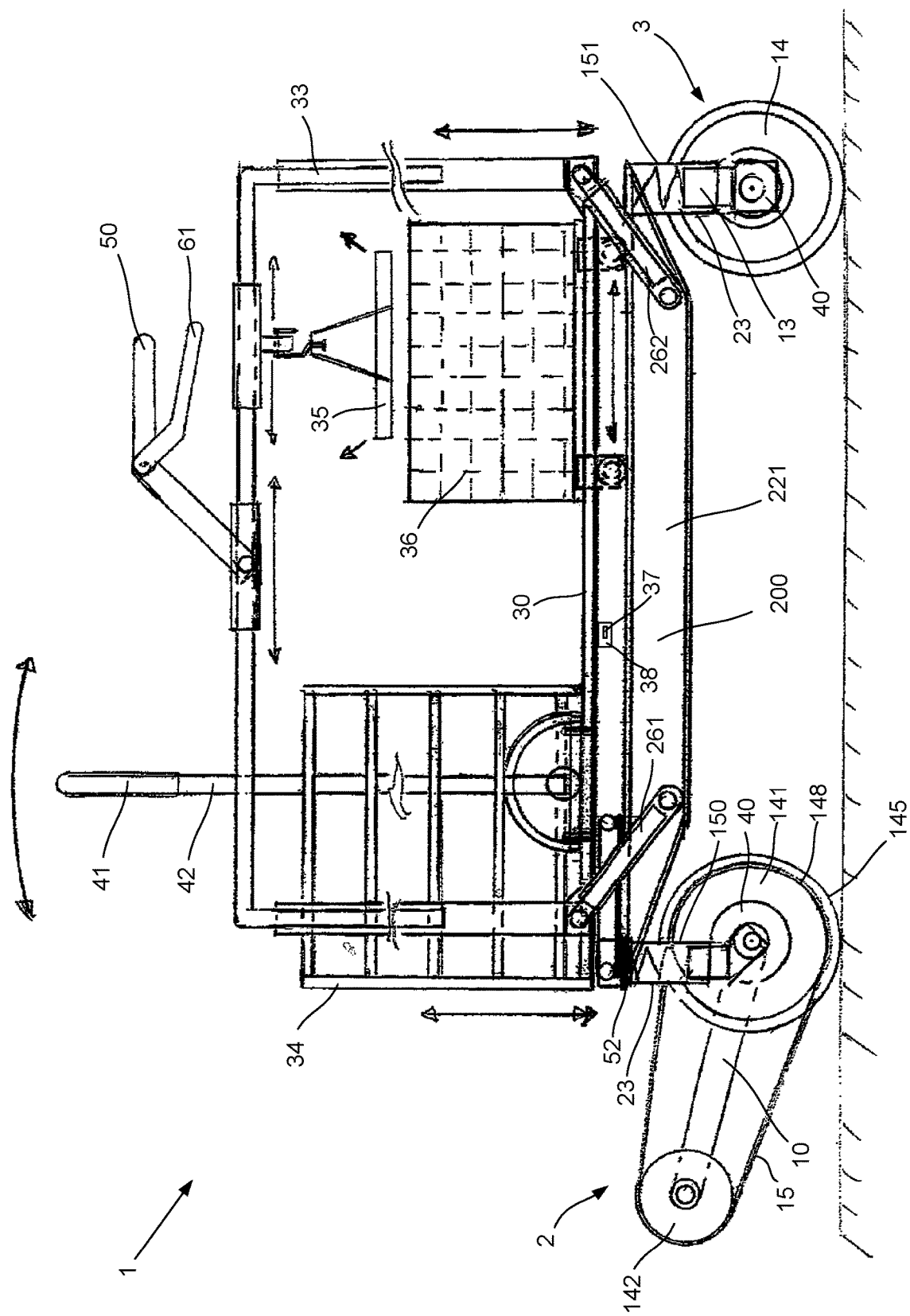
FIG. 2 is a side of another example of a multi-functional vehicle.

Referring now to FIG. 2, another example of a multifunctional vehicle is shown in a side view. The vehicle 1 is suitable for driving, transportation and rehab training, both on and off-road.

The front wheel assembly 2 here also is formed as a continuous track mechanism with a road wheel 141, an idler wheel 142 and a belt 15. Here, however, the road wheel 141 is directly supported at a lower end of the front strut 150. The axle beam 10 extends forward from the lower end of the strut 150. The axle beam 10 is arranged at an upward angle such that the idler wheel 142 is above the ground during normal operation on level surfaces.

The road wheel 141 includes laterally offset circumferential outer surfaces of different radii. The belt 15 is looped over a portion 148 of the road wheel 141 which has a slightly smaller radius than a maximum radius associated with a running surface 145 of the road wheel 141. The radius of the belt carrying portion 148 of the road wheel 141 is selected such, that the radius of the belt portion 148 plus a thickness of the belt is smaller than the radius of the running surface portion 145 of the road wheel. As a result, while traveling on hard surfaces only the running surface 145 of the road wheel is in contact with the ground, while the belt 15 is not.

The road wheel 141 may be integrally formed with stepped outer surfaces for supporting the belt and for ground contact. Alternatively, a drive roller and a separate road wheel may be coaxially arranged, the drive roller having a smaller radius than the road wheel.

The rear wheel assembly 3 here comprises a single driven rear wheel 14 which is arranged in a fixed, non-steering rear strut 151.

The front strut 150 and the rear strut 151 here each include a sprung support arm 13 and a linkage 23. The linkages 23 of the front wheel assemblies 2, 4 each contain a steering motor 52 to turn the front wheel assemblies 2, 4 left and right relative to the vehicle's frame 200.

The front 2, 4 and rear 3, 5 wheel assemblies are connected to front and rear portions of corresponding lateral frame members 221. The lateral frame members 221 are here formed as elongated beams. The lateral frame members are connected by at least one adjustable crossbar, jointly forming the generally U-shaped frame 200.

A platform 30 is connected to the lateral frame members by four separately controllable height adjustment mechanisms 261, 262. A left front height adjustment mechanism 261 connects a left front portion of the platform 30 with a front portion of the left lateral frame member 221. A left rear height adjustment mechanism 262 connects a left rear portion of the platform 30 with a rear portion of the left lateral frame member 221. The configuration is mirrored on the right side of the vehicle. The height adjustment mechanisms 261, 262 can be collectively controlled to raise the lower the platform 30. The height adjustment mechanisms 261, 262 can be individually controlled to maintain a level horizontal position of the platform 30 while the vehicle 1 is operating in uneven terrain. The platform 30 is preferably U-shaped to provide space for an operator to walk on the ground between the lateral legs of the U-shaped platform 30.

The platform 30 may include a railing 34 to prevent objects from sliding off the platform, preferably arranged in a front portion of the platform 30.

The front portion of the platform 30 may receive an exercise device 42 comprising two levers 41. The levers 41 may be connected to a generator, which may be configured to recharge a battery provided to power a motor 40. The motor 40 may be operatively connected to the rear wheel 14 to propel the vehicle 1.

A removable seat 35 and two foldable operator stands 36 can be provided. Those are slidingly attached to the platform 30 or to the railing 34 extending upward from the platform. Sliding the seat 35 or the operator stands 36 forward and backward provides the ability to control the most favorable center of gravity for the vehicle 1. The seat 35 can be unhooked when not in use. The left and right operator stands 36 can be folded up when not in use; in FIG. 2 the operator stands are shown in an upwardly folded position. The operator stands 36 may e.g. be a floor grate.

On both sides of the platform 30 a steering and support rod 33 is provided on which mechanical steering 50 and brake levers 61 can be slidably attached. Other controls, e.g. a keyboard, may also be attached to the steering and support rod 33. For the operator's convenience, the steering and support rod 33 is height-adjustable.

A gyroscope sensor 37 may be firmly connected to the platform 30 to sense a position of the platform 30, and in particular pitch and tilt of the platform 30 relative to a horizontal orientation. The gyroscope sensor 37, or another suitable pitch/tilt sensor, is operatively connected to and may be arranged within a control module 38. The four separately controllable height adjustment mechanisms 261, 262 are also operatively connected to the control module 38. The control module 38 is preferably configured to selectively activate the height adjustment mechanisms 261, 262 to maintain a generally horizontal orientation of the platform 30.

Figure 3A:
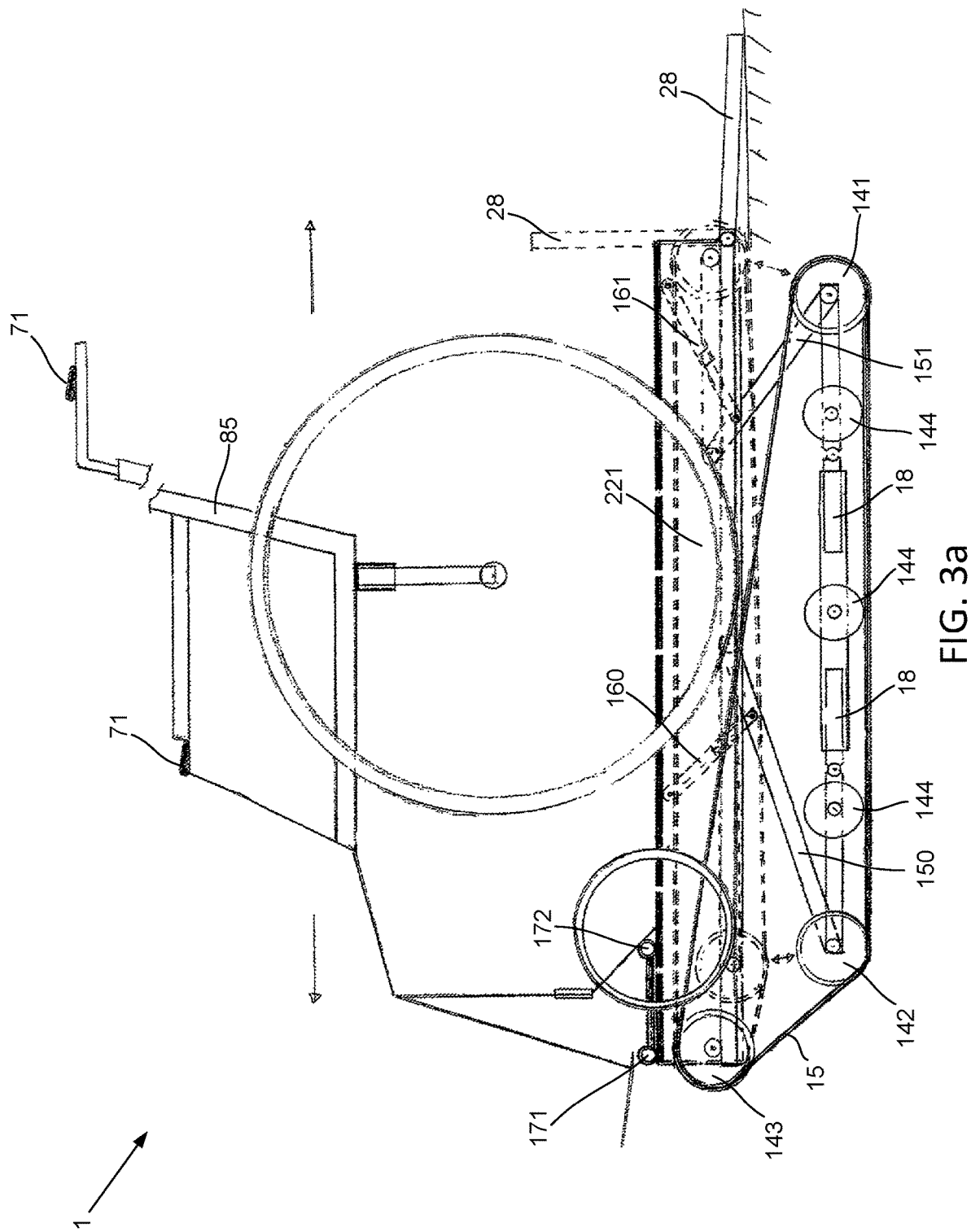
FIG. 3a is a side showing an example of a multi-functional vehicle carrying a wheelchair.
Figure 3B:
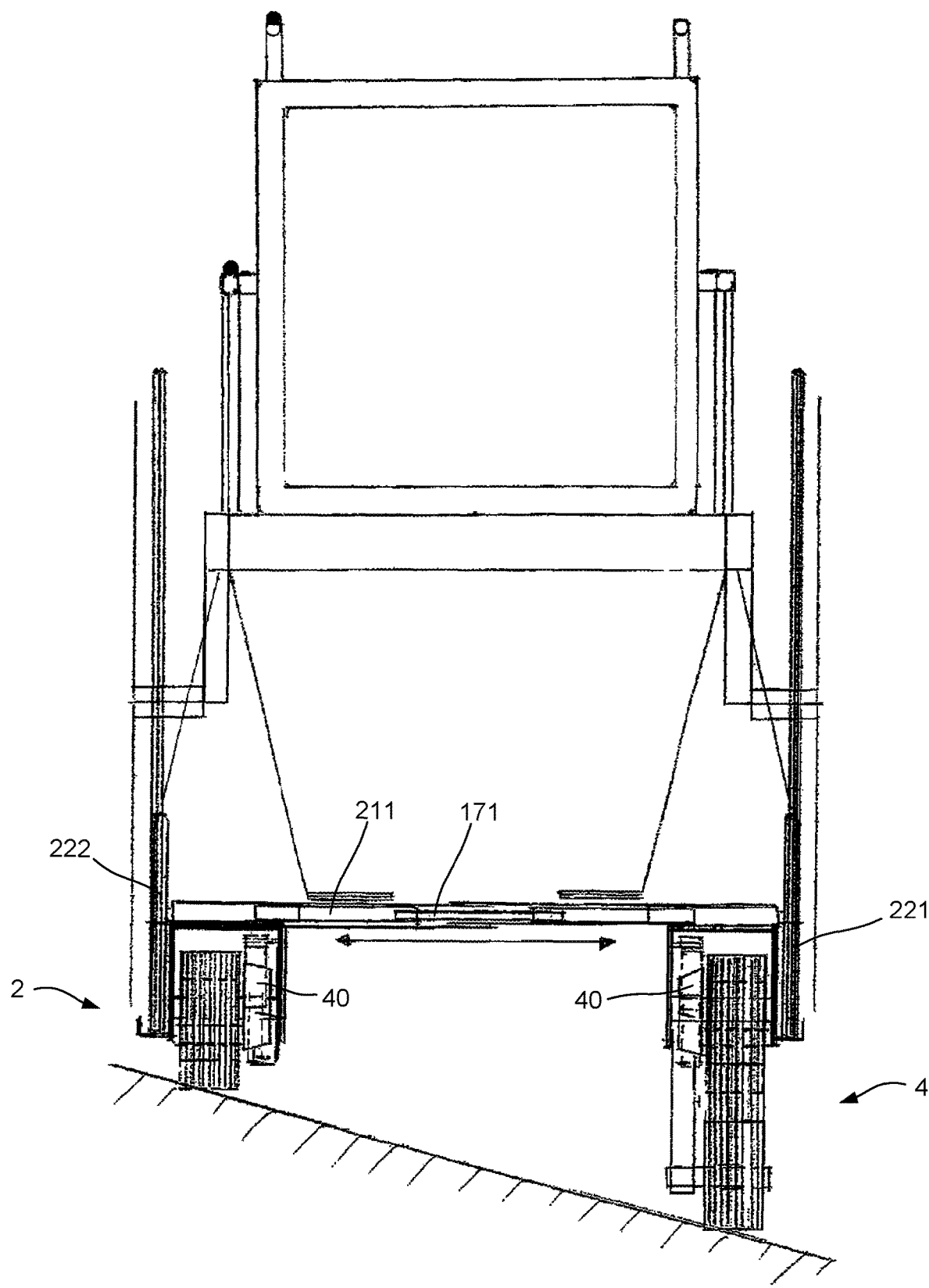

Referring now to FIG. 3a and FIG. 3b, an example of a differently configured vehicle 1 is shown. The vehicle is suitable to transport objects, e.g. a wheelchair.

The vehicle 1 includes two continuous track wheel assemblies 2, 4, one arranged on each side of the vehicle and connected to a left lateral frame member 221 and a right lateral frame member 222, respectively. Each continuous track assembly includes a front drive wheel 143, a front road wheel 142 and a rear road wheel 141. The front drive wheel 143 is connected to the lateral frame member 221. The front road wheel 142 is connected to the lateral frame member 221 by a front strut 150. The rear road wheel 141 is connected to the lateral frame member 221 by a rear strut 151. Both the front strut 150 and the rear strut 151 are hingedly connected to the lateral frame member, allowing the struts to swing up and down in a common plane. The front strut 150 is connected to the lateral frame member 221 above and behind the front road wheel 142. The rear strut 151 is connected to the lateral frame member 221 above and in front of the rear road wheel 141.

In the side view of FIG. 3a, the continuous track assembly is shown in two positions. Shown in solid lines is a raised position of the vehicle, shown in broken lines a lowered position. These positions are controlled by pivoting the front and rear struts with a height adjustment mechanism. The height adjustment mechanism includes two height adjustment actuators on each side of the vehicle.

A front height adjustment actuator 160 is pivotally connected to the lateral frame member and to a center portion of the front strut 150. The front height adjustment actuator 160 can extend and contract in length, thereby pivoting the front strut about its hinged connection at the lateral frame member.

Similarly, a rear height adjustment actuator 161 is pivotally connected to the lateral frame member and to a center portion of the rear strut 151. The rear height adjustment actuator 161 can extend and contract in length, thereby pivoting the rear strut about its hinged connection at the lateral frame member.

The drive wheel 143 is arranged above and in front of the front road wheel 142. The drive wheel 143 may be rotatably connected to the lateral frame member 221. A belt 15 is looped around the front road wheel 142, the rear road wheel 141 and the drive wheel 143, thereby assuming a generally triangular configuration. The drive wheel 143 is preferably connected to a motor 40.

One or more support wheels 144 may be arranged between the front road wheel 142 and the rear road wheel 141 to support the vehicle on the belt 15 in the ground contact area. These support wheels 144 are held by clamping cylinders with axial distance adjustment 18. They are configured to correct a center distance of the continuous belt mechanism and thus the belt tension when the struts 150, 151 are adjusted.

The lateral frame members 221, 222 are connected to one another by crossbars 211, 212. The length of each crossbar 211, 212 is adjustable by a track width adjustment mechanism 171,172. Two loading ramps 28 are connected to the frame, one to each lateral frame member. By adjusting the track width of the vehicle 1 with the variable crossbars 211, 212 the distance between the loading ramps 28 is adjusted. Thereby, wheelchairs and other wheeled equipment having different track widths can be loaded onto the vehicle 1. The width of vehicle 1 can be adjusted by the track width adjustment actuators 171,172 to correspond to the track width of the wheelchairs or other equipment. An attendant can walk in the U-shaped frame (with or without a wheelchair) and operate the vehicle 1.

A platform may be connected to the frame but is not necessary for driving with/on wheelchairs 85.

Steering of the vehicle 1 is effected by "differential steering", i.e. by different control i.e. acceleration or deceleration of the respective rotational speed of the two drive motors 40 associated with the left and right continuous track assemblies. Steering can be controlled by a user control interface 71 which can be mounted on an armrest of the wheelchair 85 and/or on a push handle of the wheelchair 85.

The frame of the walking aid vehicle 1 of this embodiment can be kept horizontal during driving in rough terrain. Pitch and roll of the frame can be actively controlled by using an autonomous control system with gyroscope, to separately adjust the front and rear height adjustment actuators 160, 161 an both sides.

The relatively long continuous track assembly shown in FIG. 3a reduces ground pressure and allows driving with the wheelchair as a load on muddy or sandy terrain that could not be otherwise traversed with wheels.

Figure 4A:
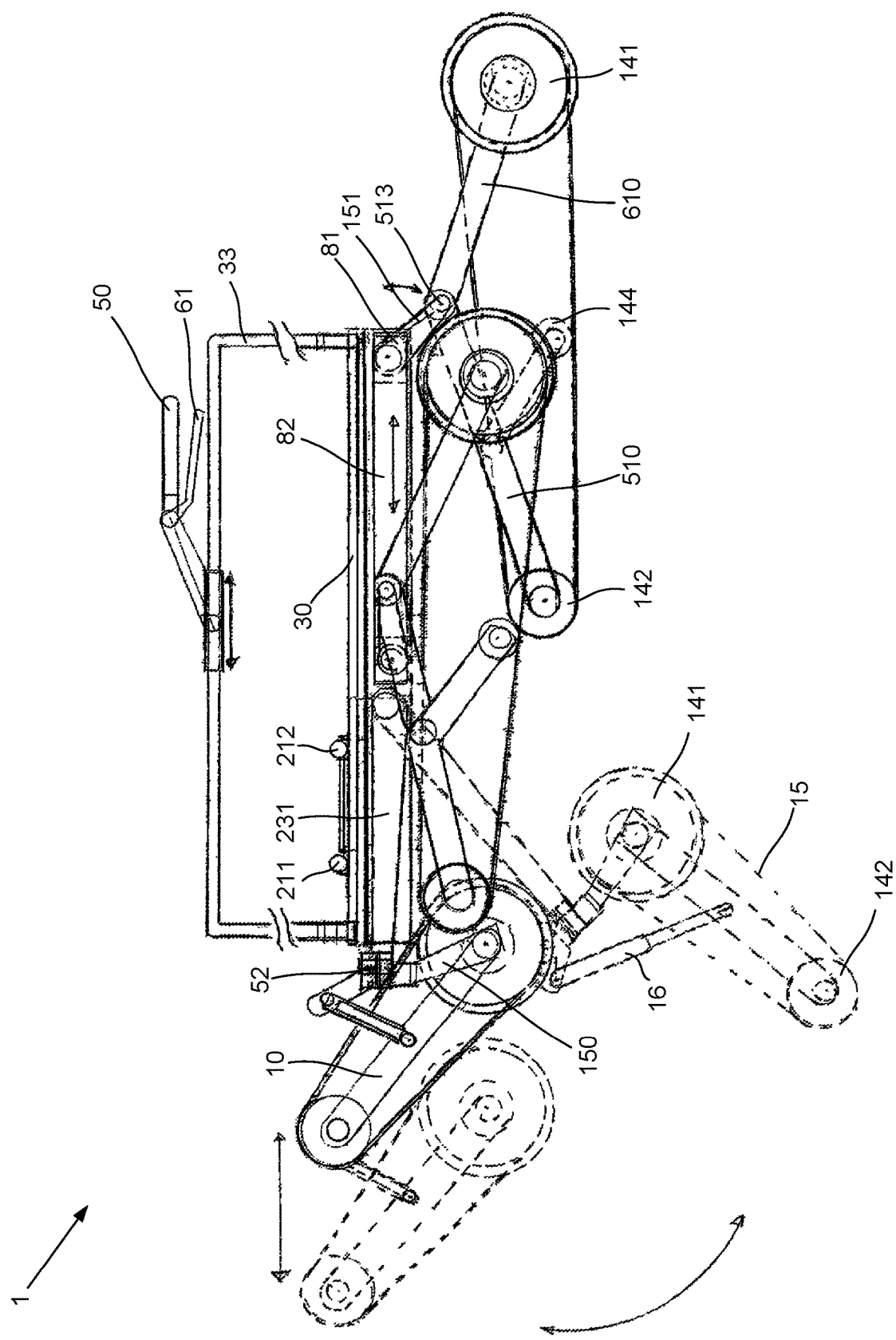
FIG. 4a is a side view of a vehicle having an adjustable track-width and wheelbase.
Figure 4B:
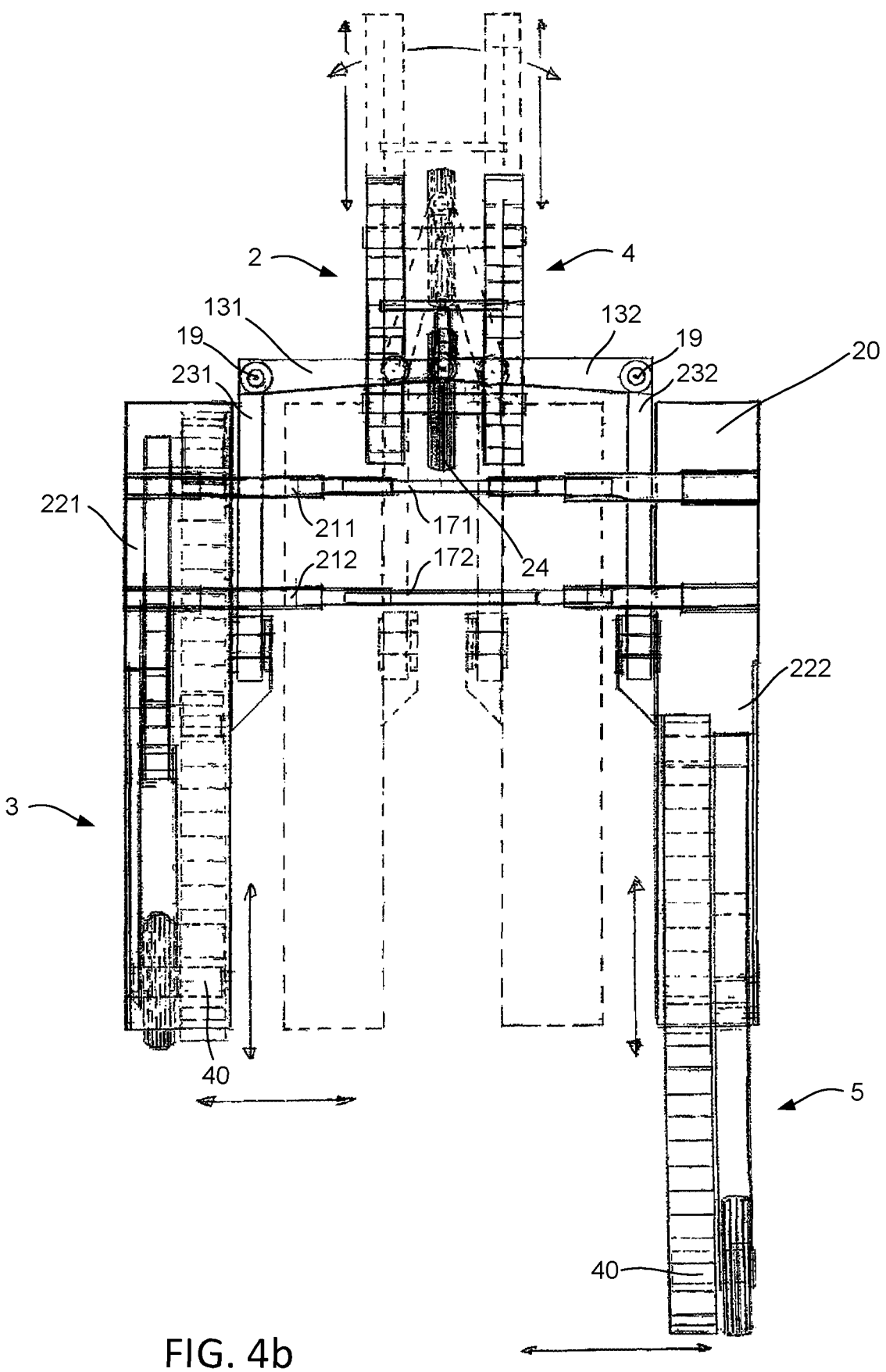

Referring to FIG. 4a and FIG. 4b, yet another example of a vehicle 1 is presented. The vehicle 1 is configured as a walker to overcome even abrupt changes in inclination in rough terrain and on stepped surfaces. The vehicle is constructed of a generally U-shaped frame 20 with a platform 30 and four continuous track assemblies 2, 3, 4, 5. The frame 20 includes lateral frame members 221, 222 which are connected by length-adjustable crossbars 211, 212.

Two continuous track assemblies are attached in the front to the frame 20. More specifically, a left front track assembly 2 is hingedly connected to a left front strut 150. The left front strut 150 is pivotally connected to a left cross arm 131 by a left steering actuator 52. The left cross arm 131 is pivotally connected by a hinge 19 to a left longitudinal arm 231. The left longitudinal arm 231 is slidingly connected to the left lateral frame member 221.

In a mirrored configuration a right front track assembly 4 is hingedly connected to a right front strut. The right front strut is pivotally connected to a right cross arm 132 by a right steering actuator. The right cross arm 132 is pivotally connected by a hinge 19 to a right longitudinal arm 232. The right longitudinal arm 232 is slidingly connected to the right lateral frame member 222.

The left and the right front continuous track assemblies 2, 4 each include a rear wheel 141, a front wheel 142, and a belt 15 looped around both wheels. A front wheel axle and a rear wheel axle are held at a front end and a rear end of an axle beam 10, respectively. A pitch of the axle beam 10 is adjustable by an adjustment mechanism 16 which is length adjustable and connects a center portion of the axle beam 10 to the respective left and right cross arm 131, 132.

The height adjustments 16 and steering actuators 52 enable the front wheel assemblies to be controlled in a suitable position for abrupt inclination changes in uphill and downhill driving and in a steering mode. A track width adjustment by actuation of the crossbar actuators 171, 172 on the frame crossbars 211, 212 can be performed. Extension and contraction of the crossbar actuators 171, 172 is associated with a pivoting of the cross arms 131, 132. The track width adjustment can be further coordinated with a longitudinal adjustment of the front wheel assemblies 2, 4 by forward and backwards movement of the longitudinal arms 231, 232 within rails of the lateral frame members 221, 222.

The left front continuous track assembly 2 and the right front continuous track assembly 4 may be fixedly connected to one another and may include a central front wheel 24. The central front wheel 24 may be coaxially arranged with the respective rear wheels 142 of both continuous track assemblies 2,4. In some configurations, the left and right front wheel assemblies may be combined and instead one central front wheel assembly may be used.

A left rear wheel assembly 3 and a right rear wheel assembly 5 are longitudinally slidingly connected to the left and right lateral frame members 221, 222. The vehicle 1, as shown, is essentially a three-wheeled vehicle having a three-point suspension.

The rear wheel assemblies 3, 5 may include a front wheel 142, a rear wheel 141, and a support wheel 144 in between. We may refer to these rear wheel assemblies as bogies. The bogie is connected to a sliding bracket 81 arranged within a sliding channel or rail 82 in the side frame member. The sliding bracket 81 can move forward and backward within the lateral frame member, thereby extending and shortening the vehicle's wheelbase.

The bogies 3, 5 are preferably mounted to the sliding bracket 81 by a pivoting strut 151 which can pivot within a generally vertical plane. The pivoting strut 151 is pivotally connected to an axle beam, which here includes a front axle beam 510 and a rear axle beam 610. The front axle beam 510 extends from the front wheel 142 to the pivoting strut 151. The rear axle beam 610 extend from the pivoting strut 151 to the rear wheel 141. The front axle beam 510, the rear axle beam 610 and a lower end of the pivoting strut 151 are connected to one another by a common pivot pin 513.

The wheels 141, 142, 144 of the bogie are provided for constantly bearing ground contact. The rear wheels 141 may consist of a combination of wheels and laterally arranged rollers which support the looped belt 15. The rear wheels 141 may each be operatively connected to a drive motor 40. To use the lower running resistance of the wheels 141, the wheel assemblies have rear-carrying wheels 141 which have a slightly larger radius than the adjacent rollers plus a thickness of the belt.

In order not to hinder lifting of the front wheel assemblies, the frame crossbars 211, 212 with track width adjustments 171, 172 are mounted above the platform 30. The platform here includes only side panels onto which steering linkage 33, slidable steering 50 and brake handles 61 are attached.

When used in rough terrain, steering is affected by a combination of steering the front wheel assemblies and differential steering of the rear wheel assemblies. When used on stairs or solid paths, steering the front wheel assemblies is sufficient. For driving over the top step of a staircase, either upward or downward, the height adjustment of the front wheel assemblies is controlled such that the front wheel assemblies 2, 4 always stay on the ground. The rear wheel assemblies (bogies) 3, 5 are controlled by the axial adjustment of the sliding bracket 81 and height adjustments 16 so that the transition corresponding to the current given center of gravity of the vehicle including load is optimized.

Depending on the setting of the track width, also loads can be transported and/or one can ride on the sides of the platform.

Figure 5A:
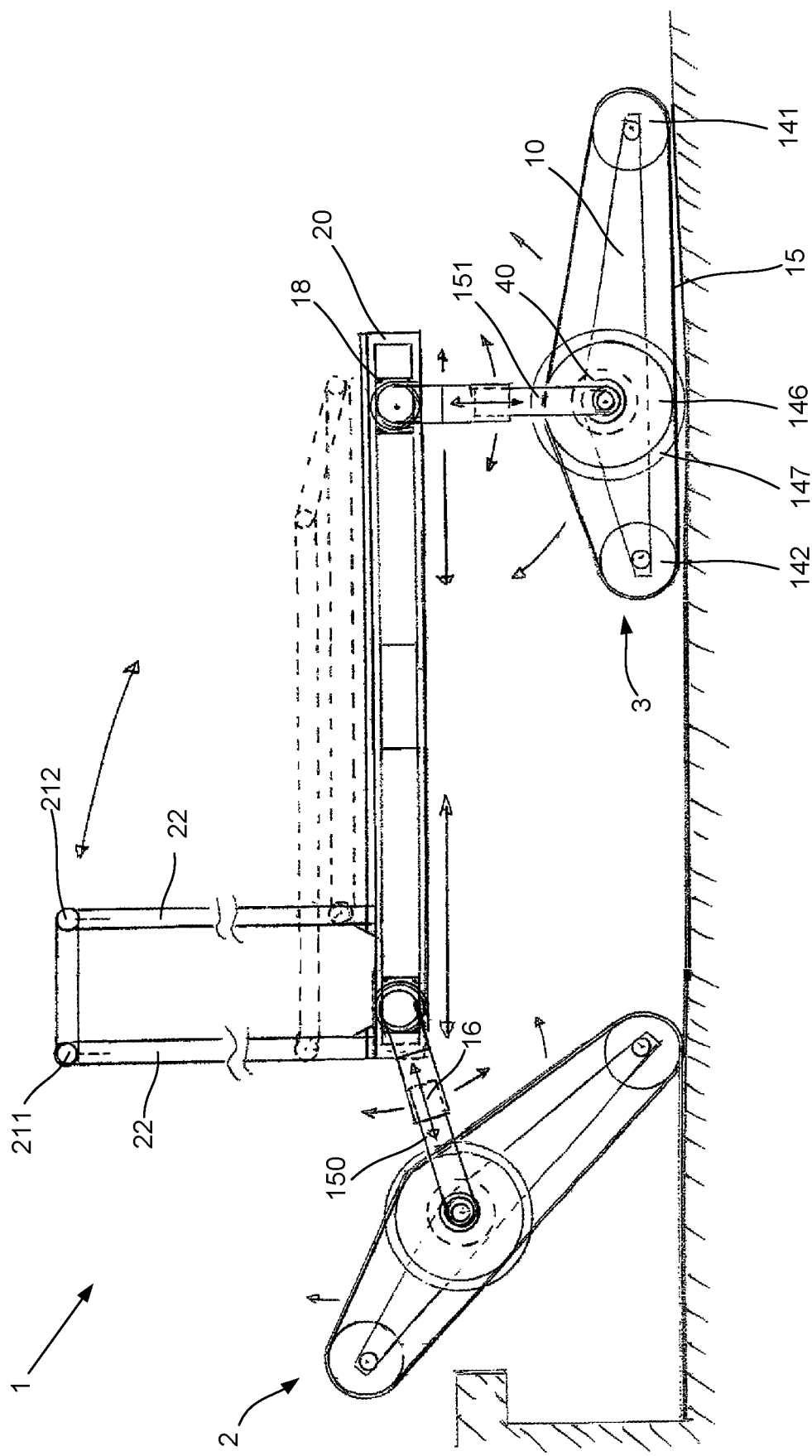
FIG. 5a is a side view of another example of a vehicle.
Figure 5B:
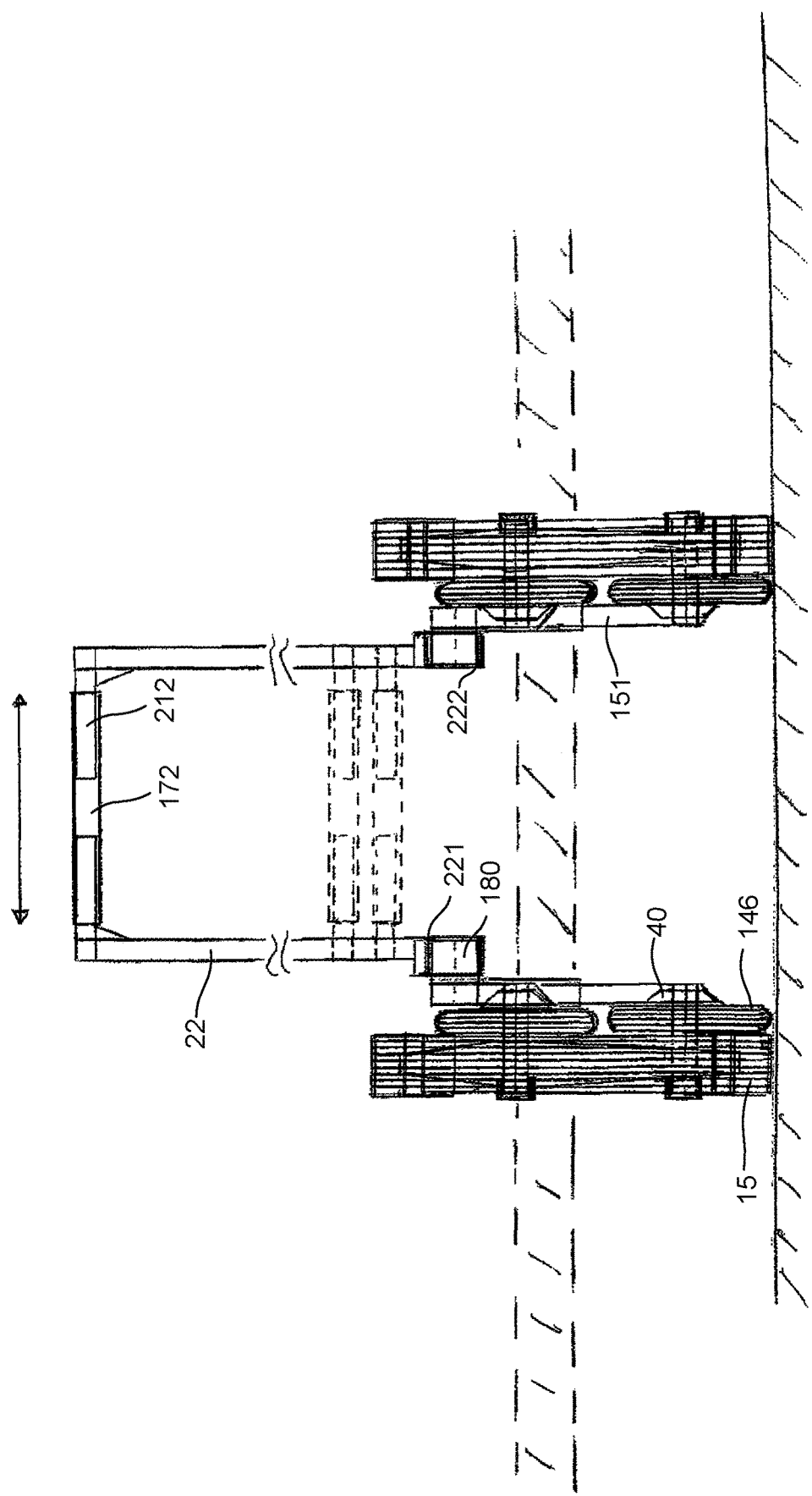

Referring now to FIG. 5a and FIG. 5b, another example of a vehicle 1 is shown. The vehicle 1 is suitable to support handicapped persons while walking and also suitable to transport loads. The vehicle includes four continuous track wheel assemblies, each having a central wheel 146, a front idler wheel 142 and a rear idler wheel 141 around which a rubber belt 15 is looped. The central wheel 146 and the idler wheels 141, 142 are connected by an axle beam 10. Road wheels 147 may be coaxially arranged on a common axle with the central wheels 146, the road wheels 147 having a slightly larger radius than the central wheels 146 plus a width of the rubber belt 15. On hard surfaces, the road wheels 147 may thus be the only part of the vehicle in contact with the ground. The central wheel 146 and road wheel 147 may be driven by a motor 40.

The wheel assemblies 2,3,4,5 are connected to a frame 20 of the vehicle by telescoping struts 150, 151 with integrated height adjustment 16. Upper ends of the struts may be pivotally and slidingly connected to the frame. That is, upper ends of the struts can slide forward and backward within the frame 20 and rotate in a vertical plane relative to the frame 20.

The frame 20 preferably includes two lateral frame members 221. 222 connected by variable-length crossbars 211, 212. The variable length crossbars 211, 212 here are connected at upper ends of portal-shaped vertical beams 22 of the lateral frame members 221, 222 and can serve as handlebars for a user to hold onto.

The struts 151 are arranged outwardly of the lateral frame members 221,222 and may be configured to rotate 360 degrees around their sliding pivot joint. In the configuration shown the struts 151 and the lateral frame members are arranged in parallel planes. Axle distance adjustment mechanisms 18 allow the pivot joints which connect the struts 150, 151 to the lateral frame members to slide within a rail 180 on the lateral frame members 221, 222.

The adjustment mechanisms, i.e. the telescoping height adjustment 16 of the struts 150, 151, rotation of the struts about their upper ends, and longitudinal position adjustment of the struts is preferably automated and controlled by an electronic control unit. The control unit may in particular be configured to maintain a generally level position of a handlebar held onto be a user, while ensuring continuous stability of the device, i.e. a continued ability of the user to exert forces onto the handlebar without tipping the vehicle over.

A platform may be provided which may consists only of narrow side parts, which can be equipped with carriers for transport and standing peds or platforms for driving.

The downwardly open portal of the frame crossbars 211,212 with track width adjustment 171, 172 arranged at upper ends of vertical beams 22 allows to attach a holder for people with walking difficulties, who perform walking exercises in terrain without trails or using the portal to drive over people or objects of different widths in order to raise/lift them up and to drive along the portal along e.g. rows of plants or fences to work on them. Devices for steering, brakes and other controls can be provided on the vehicle directly or via remote controls.

Figure 6A:
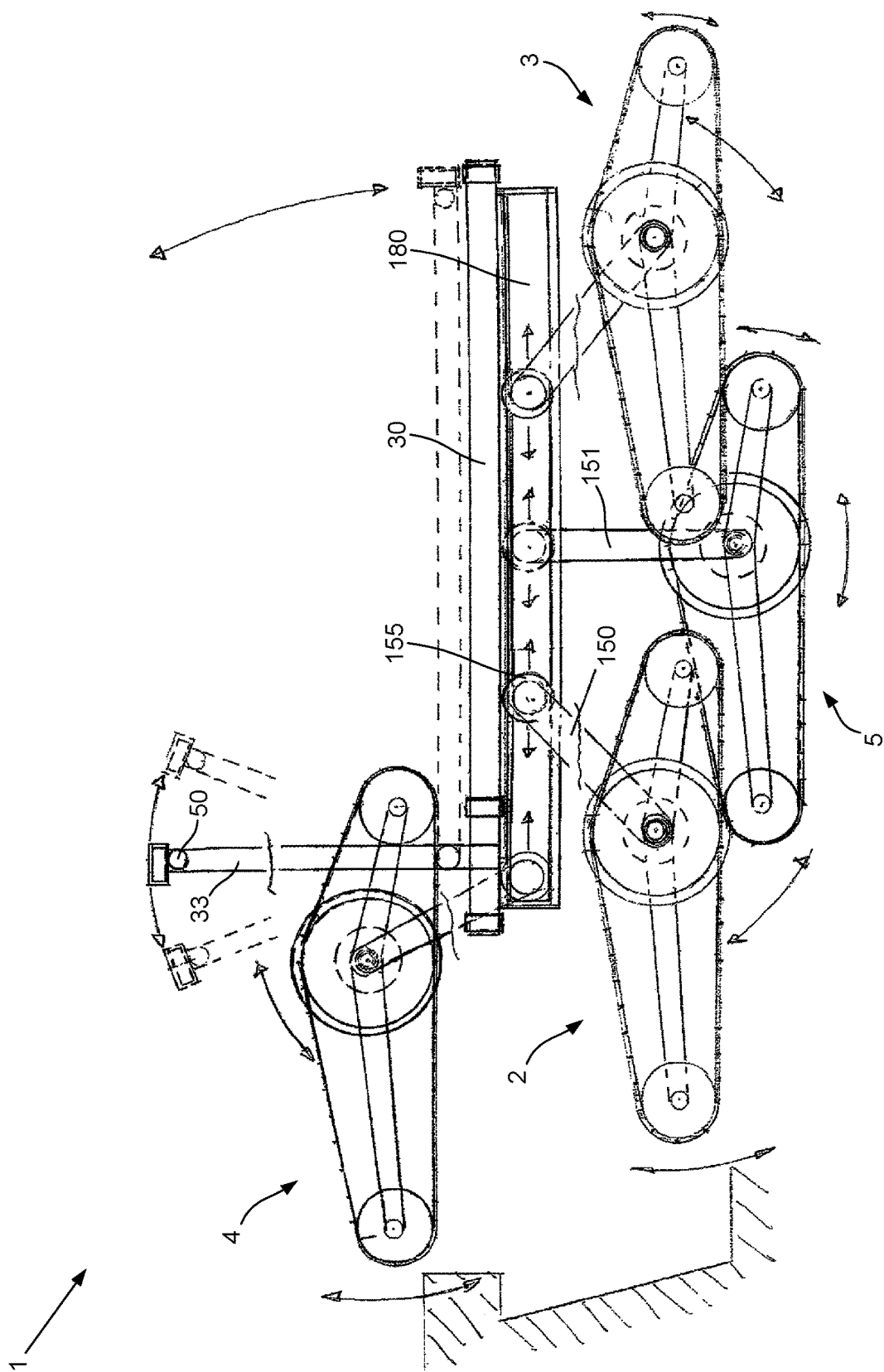
FIG. 6a shows a vehicle capable of operating in multiple gaits.

Referring now to FIG. 6a, FIG. 6b and FIG. 6c, an example of a vehicle 1 is shown which can lift its wheel assemblies 2,3,4,5 higher than its platform 30. The vehicle can operate not only in a driving mode by rolling on its continuous tracks but also operate by taking steps in a walking or climbing gait. Thereby, the vehicle 1 can transition relatively high, and even protruding steps. In FIG. 6a, the front right wheel assembly 4 is shown in an elevated position without ground contact. The right rear wheel assembly 5 is shown in a lowered position with its strut 151 extending vertically downward from a middle of the right lateral frame member 222. The right rear wheel assembly 5 may for example be maneuvering a sink. The front left wheel assembly 2 and the rear left wheel assembly 3 are controlled to assume positions which ensure a safe three-point support of the vehicle 1 (with normal center of gravity). The three-point support provided by the right rear wheel assembly 5 and the left wheel assemblies 2,3 is maintained until the vehicle has traveled far enough forward for the front right wheel assembly 4 to have secure ground contact at the elevated level. At this point, the three-point support is switched over to be assumed by both right wheel assemblies 4, 5 and the left rear wheel assembly 3. The left front wheel assembly 2 at that time is controlled to step up from the lower surface level to the higher surface level. This is accomplished by rotating the left front strut 150 about its pivot axis at the left frame member 221 into a position above the platform 30. The rear wheel assemblies 3, 5 follow the same process, one at a time, until the vehicle has climbed the step.

The lateral frame members 221, 222 include rails 180 in which upper ends of the struts 150, 151 of the wheel assemblies are slidingly supported in sliding strut brackets 155. This allows the vehicle 1, within limits of maintaining a stable stance, to move its frame and platform forward and backward while the wheel assemblies remain in the same position on the ground.

In the embodiment shown, no frame crossbars with track width adjustment are present. Instead, the platform 30 takes over the role of the frame crossbars. It is therefore particularly torsionally rigid and circumferentially connected to the lateral frame members 221, 222 to accommodate torsional forces arising in the diagonal passage. The platform includes fasteners 31 for accommodating heavy loads, for example tools 32, in them. In FIG. 6 *b* the platform 30 in frame function is U-shaped. In FIG. 6c, the lateral frame members 221, 222 are shown locked together in a narrow configuration.

A steering linkage 33 is arranged at a front portion of the platform. The steering linkage 33 can be tilted and moved and carries a handlebar 50 for holding and steering. A keyboard and other control of the vehicle 1 may be connected to the handlebar 50. Braking of the vehicle 1 is affected by appropriate activation of the drive motors 40. The vehicle can alternatively be operated with a remote control and/or by (semi-)autonomous control.

The configurations shown in FIG. 5a/b and FIG. 6a/b/c provide a very large steerable wheelbase. It allows to use the vehicle, which may serve as a walker, not only to operate on solid, flat ground, but in a combination mode of simultaneous driving and "stepping" also too overcome steep, stepped terrain and narrow trenches.

As shown in the top views of FIG. 6b, the wheel assemblies may be arranged such that a wheel assembly 5 on one side of the vehicle is longitudinally centrally arranged between the wheel assemblies 2, 3 of the other side. This creates a stable triangular space within which the center of gravity of the vehicle is supported while the fourth wheel assembly 4 is lifted.

Figure 7A:
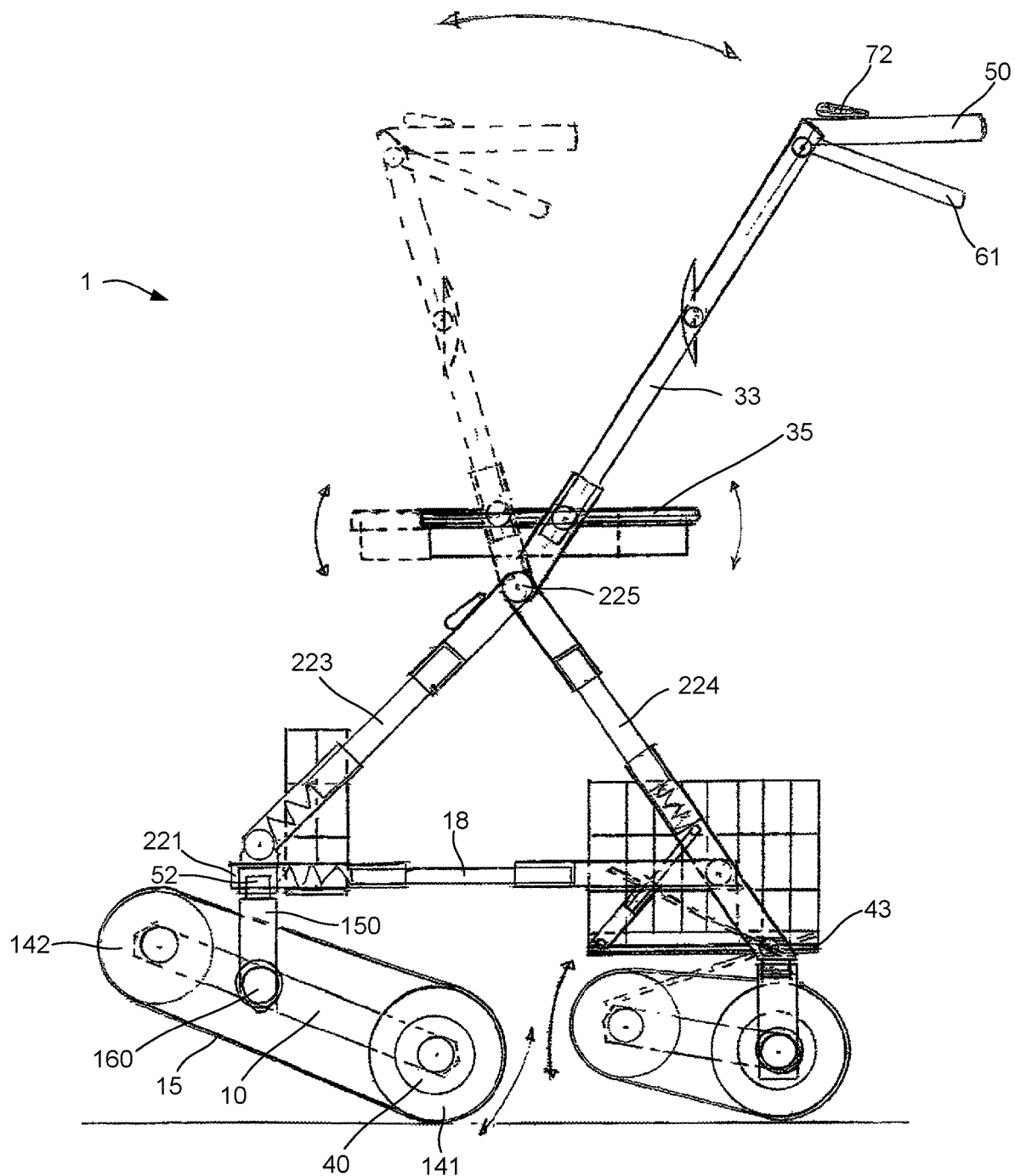
FIG. 7a is a side view of a vehicle with track-width and wheelbase adjustment.
Figure 7B:
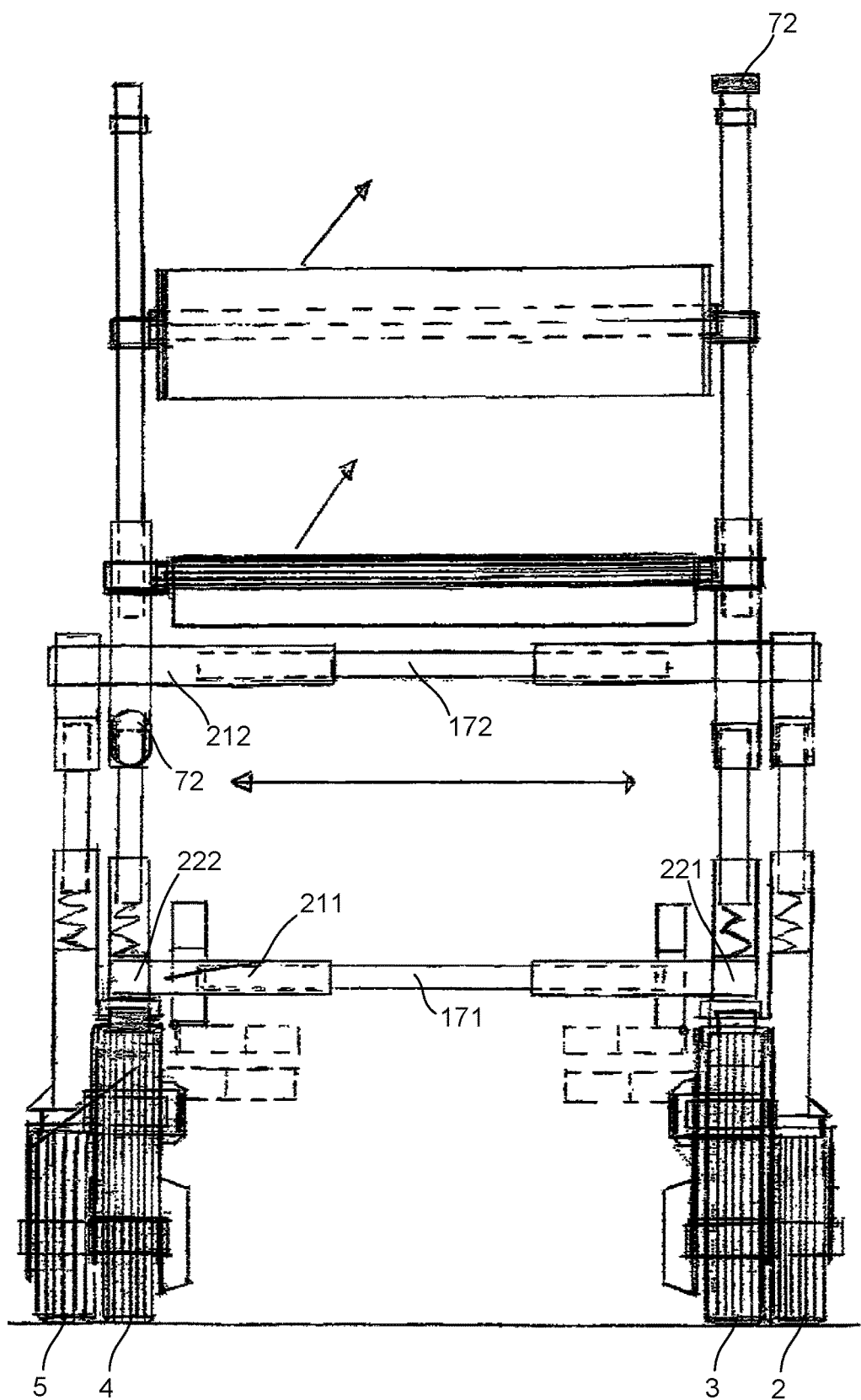

Finally, referring to FIG. 7a and FIG. 7b yet another example of a vehicle 1 suitable for use as a walker, cargo carrier, or moving platform for attaching tools is illustrated. The vehicle uses two height-adjustable wheel assemblies on each side. The wheel assemblies are preferably formed as continuous tracks, each having a front wheel 142 and a rear wheel 141 around which a continuous rubber belt 15 is looped. The front and the rear wheel are rotatably connected at a distance from one another to an axle beam 10. The rear wheel 141 is preferably powered by an electric motor 40.

Height-adjustment of the vehicle is accomplished by adjusting a pitch of the axle beam 10. The axle beam 10 is pivotally supported at a lower end of a strut 150. The angular orientation between the strut 150 and the axle beam 10 can be controlled by a height adjustment actuator 160. The height adjustment actuator 160 acts as a pivot joint between the axle beam 10 and the strut 150 and may be arranged at a center portion of the axle beam 10. Alternatively, the height adjustment actuator 160 between the axle beam 10 and the strut 150 may be arranged at an end portion of the axle beam 10 and may be coaxial with an axis of rotation of the rear wheel 141.

Upper ends of the struts 150 are pivotally connected to lateral frame members 221, 222 of the vehicle so that they can rotate about their longitudinal axis. The upper ends of the struts 150 may in particular be connected to the lateral frame members 221, 222 by controllable steering actuator to steer the vehicle. The controllable steering joints may include a steering actuator 52.

The left and right lateral frame members 221, 222 here each include an elongated front frame bar 223 which is pivotally connected to a rear frame bar 224 at an angle. The front wheel assembly 2 is arranged at a front end of the front frame bar 223. The rear wheel assembly 3 is arranged at a rear end of the rear frame bar 224. The front end of the front frame bar 223 and the rear end of the rear frame bar 224 are connected to one another by a wheelbase adjustment actuator 18. The wheelbase adjustment actuator 18 has a controllable length. The wheelbase adjustment actuator 18, the front frame bar 223 and the rear frame bar 224 form sides of a triangle. Hinged support surfaces 43 or foot pegs can be connected to the front- and/or rear frame bars 223, 224.

Support rods 33 are pivotally connected and extends generally upwardly from the hinge 225 between the front frame bar 223 and the rear frame bar 224. Upper ends of the support rods 39 of the left frame member 221 and the right frame member 223 extend into steering handles 50 and may support one or two brake levers 61. The support rods 33 serve to attach a seat 35 or a leaning console which are pivotally mounted to compensate for different pitch of the ground over which the vehicle 1 travels.

A keyboard 72 for steering and controlling the drives including the engine brake is mounted on the steering handle 50 and/or the front frame bar 223. The intended similarity to a traditional walker allows a user who is familiar with such to move with the vehicle on rough terrain impassable by a traditional walker.

As shown in FIG. 7b, the front wheel assemblies 2, 4 and the rear wheel assemblies 3, 5 need not be arranged in a common plane. Rather, the vehicle may have different track widths in the front and in the rear. The front track width and the rear track width of the vehicle can be adjusted by track width adjustment actuators 171, 172. The track width adjustment actuators are part of variable length crossbars 211, 212.

Within this paper terms such as "front", "rear", "behind" etc. are based on a primary travel direction of the vehicle while in use but should not be understood to exclude the vehicle from traveling backwards.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A vehicle, comprising:
   a frame having
      a left lateral frame member and
      a right lateral frame member,
      the left lateral frame member and the right lateral frame member being connected by a crossbar;
   a left front wheel assembly attached to the left lateral frame member;
   a left rear wheel assembly attached to the left lateral frame member;
   a right front wheel assembly attached to the right lateral frame member; and
   a right rear wheel assembly attached to the right lateral frame member,
   wherein at least two of the wheel assemblies are continuous track assemblies,
      each including
      a drive wheel operatively connected to a motor,
      an idler wheel,
      an axle beam rotatably supporting the drive wheel and the idler wheel at a distance from one another, and
      a continuous belt looping around the drive wheel and the idler wheel, and
   wherein the crossbar includes a track width adjustment actuator configured to extend and contract a length of the crossbar and thereby change a track width of the vehicle.

2. The vehicle as in claim 1 wherein the front wheel assemblies are the continuous track assemblies, the vehicle further comprising on each side:
   a front strut having a lower end firmly connected to the axle beam of the front wheel assembly and an upper end rotatably connected to the lateral frame member so as to be able to rotate about a generally vertical steering axis.

3. The vehicle as in claim 2, further comprising on each side of the vehicle:
 a front strut bracket pivotally connecting the upper end of the front strut to the lateral frame member with a front strut pivot pin; and
 a height adjustment actuator being configured to pivot the front strut about the front strut pivot pin.

4. The vehicle as in claim 3, wherein the front strut bracket is slidably arranged within a rail respectively formed in each lateral frame member.

5. The vehicle as in claim 3, further comprising on each side of the vehicle:
 a steering actuator arranged between the front strut bracket and the front strut, the steering actuator configured to rotate the front strut about its steering axis.

6. The vehicle as in claim 3,
 wherein the height adjustment actuator has a first end pivotally connected to the front strut bracket and a second end pivotally connected to the lateral frame member, the height adjustment actuator being configured to extend and contract its length and thereby pivot the front strut and the wheel assembly connected thereto about the front strut pivot pin.

7. The vehicle as in claim 3, wherein the front strut is arranged outwardly of the lateral frame member.

8. The vehicle as in claim 1,
 wherein the track width of the vehicle can be adjusted while driving.

9. The vehicle as in claim 1, wherein
 a front track width between the front wheel assemblies and
 a rear track width between the rear wheel assemblies are not the same.

10. A vehicle, comprising:
 a frame having
  a left lateral frame member and
  a right lateral frame member,
  the left lateral frame member and the right lateral frame member being connected by a variable-length crossbar, a length of the crossbar being adjustable by a track width adjustment actuator configured to extend and contract the crossbar and thereby change a track width of the vehicle;
 a continuous track left front wheel assembly attached to the left lateral frame member;
 a continuous track left rear wheel assembly attached to the left lateral frame member;
 a continuous track right front wheel assembly attached to the right lateral frame member; and
 a continuous track right rear wheel assembly attached to the right lateral frame member,
 wherein each continuous track wheel assembly includes
  a front wheel,
  a rear wheel,
  a continuous belt looping around the front wheel and the rear wheel,
  an axle beam rotatably supporting the front wheel and the rear wheel at a distance from one another, and
  a strut connecting the axle beam to the lateral frame member.

11. The vehicle as in claim 10, wherein an actuator is arranged in a pivot joint which connects the strut and the axle beam, the actuator being configured to adjust an angle between the strut and the axle beam.

12. The vehicle as in claim 10, wherein an actuator is arranged in a pivot joint which connects the strut and lateral frame member, the actuator being configured to adjust an orientation of the strut.

13. The vehicle as in claim 10, wherein the strut is a telescoping strut and includes a height adjustment actuator configured to control a length of the telescoping strut.

14. The vehicle as in claim 10,
 wherein the strut is connected to a sliding strut bracket, the sliding strut bracket being slidingly arranged in a rail extending along the lateral frame member, and
 wherein an axle distance adjustment actuator is arranged at the rail to slide the sliding strut bracket forward and backward within the rail.

15. The vehicle as in claim 10,
 wherein the vehicle is configured as a walker and includes a height-adjustable railing.

16. The vehicle as in claim 10,
 wherein the vehicle includes a seat or a stand which is slidingly arranged within the frame and
 wherein a position of the seat or the stand relative to the frame is actively controlled to maintain a beneficial position of the vehicle's center of gravity.

17. The vehicle as in claim 10,
 further comprising a platform which is connected to the frame by four separately controllable height adjustment actuators.

18. The vehicle as in claim 17, further comprising:
 a gyroscopic sensor mounted on the platform; and
 an electronic control module operatively connected to the gyroscopic sensor and to the separately controllable height adjustment actuators, the electronic control module being configured to control the height adjustment actuators in response to data received from the gyroscopic sensor to maintain an approximately level orientation of the platform.

\* \* \* \* \*